(12) United States Patent
Graves et al.

(10) Patent No.: US 12,129,089 B1
(45) Date of Patent: Oct. 29, 2024

(54) ADHESIVE FLAVOR STRIP FOR BEVERAGE CONTAINERS AND/OR EDIBLE PRODUCTS

(71) Applicant: STICK IT AND LICK IT LLC, Dallas, TX (US)

(72) Inventors: Jeremy Graves, Dallas, TX (US); Meredith N. Graves, Dallas, TX (US)

(*) Notice: Subject to any disclaimer, the term of this patent is extended or adjusted under 35 U.S.C. 154(b) by 0 days.

(21) Appl. No.: 18/432,961

(22) Filed: Feb. 5, 2024

Related U.S. Application Data

(60) Provisional application No. 63/498,570, filed on Apr. 27, 2023.

(51) Int. Cl.
| | |
|---|---|
| *B65D 65/46* | (2006.01) |
| *A23L 2/56* | (2006.01) |
| *A23L 27/00* | (2016.01) |
| *A23L 27/20* | (2016.01) |
| *A23P 10/10* | (2016.01) |

(52) U.S. Cl.
CPC .............. *B65D 65/463* (2013.01); *A23L 2/56* (2013.01); *A23L 27/204* (2016.08); *A23L 27/75* (2016.08); *A23P 10/10* (2016.08)

(58) Field of Classification Search
CPC ........ B65D 65/463; A23P 10/10; A23L 27/75; A23L 27/204; A23L 2/56
USPC .......................................................... 426/650
See application file for complete search history.

(56) References Cited

U.S. PATENT DOCUMENTS

2020/0017265 A1* 1/2020 Loftis, Jr. ................. A23L 2/52

* cited by examiner

*Primary Examiner* — Brent T O'Hern
(74) *Attorney, Agent, or Firm* — HAYNES AND BOONE, LLP

(57) ABSTRACT

An adhesive flavor strip is provided. The adhesive flavor strip is configured to be adhered to a beverage container or an edible product. The adhesive flavor strip includes a length, a width, and a thickness; a consumer-facing surface extending along the length and the width of the flavor strip. The adhesive flavor strip has a flavor and is configured to be licked or to make contact with the mouth of the consumer while adhered to the beverage container or the edible product to provide the consumer a taste of the first flavor.

23 Claims, 3 Drawing Sheets

ADHESIVE FLAVOR STRIP FOR BEVERAGE CONTAINERS AND/OR EDIBLE PRODUCTS

RELATED APPLICATION

This application claims the benefit of the filing date of, and priority to, U.S. Application No. 63/498,570, filed Apr. 27, 2023, the entire disclosure of which is hereby incorporated herein by reference.

BACKGROUND

This disclosure relates in general to an adhesive flavor strip that can be attached to a beverage container, a smoking apparatus, and/or an edible product such as a food product.

DETAILED DESCRIPTION

Figure 1:
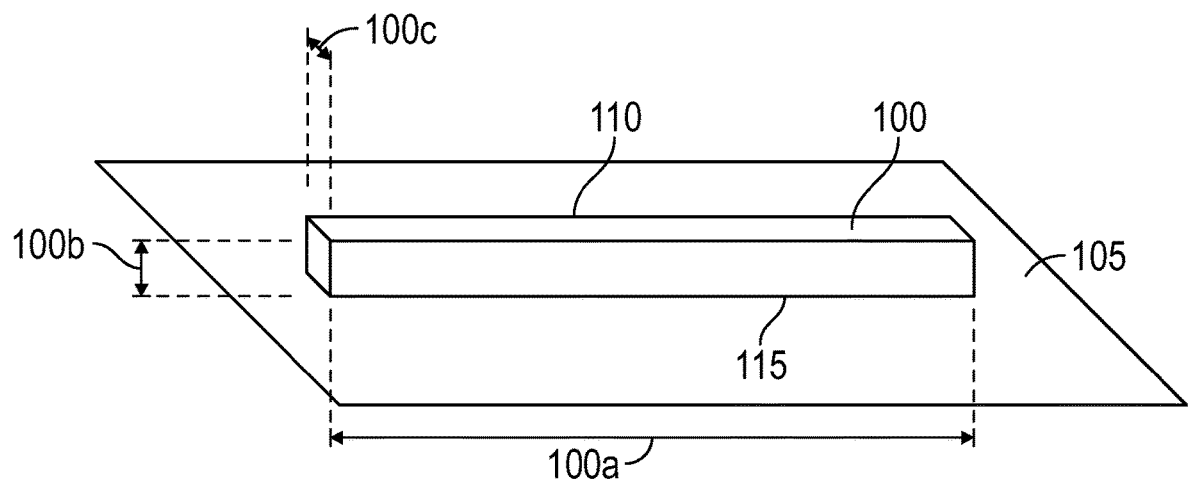
FIG. 1 illustrates a flavor strip applied to a surface, according to an example embodiment.

Referring to FIG. 1, illustrated is a diagrammatic view of one example flavor strip 100 applied to a surface 105, which may include a beverage container or an edible product. Generally, the flavor strip 100 is configured to enhance, compliment, or augment the flavor of the edible product or beverage. In some embodiments, the consumer of the beverage or edible product licks the flavor strip 100 before drinking the beverage or consuming the edible product, but in other embodiments the flavor strip 100 is placed in contact with the lips of the user when the user sips the beverage or the flavor strip 100 is eaten along with the edible product. One example use of the flavor strip 100 is using the flavor strip in place of a salted rim of a margarita. While the flavor associated with the salted rim of the margarita is generally single-use (e.g., once the salt is licked from a portion of the rim that portion of the rim no longer has salt, and therefore, that portion of the salted rim is single-use), a flavor strip 100 may be multiple-use in that the flavor strip 100 can be licked multiple times and continue to provide the salt flavor to the consumer. The flavor strip 100 is not limited to uses that replace conventional beverage garnishes and/or flavoring (e.g., salted rim). For example, the flavor strip 100 may be used to provide new flavor pairings or provide conventional flavors via new modalities. An example of providing conventional flavors via new modalities includes applying the flavor strip 100 to the container of a carbonated water beverage, which may be considered flavor-less, to provide flavoring to the otherwise flavor-less beverage. The flavor strip 100 may have a Coca-Cola® flavor that, when consumed along with the flavor-less beverage, mimics the traditional carbonated Coco-Cola® drink flavor. This example provides flavor customization to the consumer and provides a hydrating beverage.

One advantage of the flavor strip 100 is that the flavor strip 100 provides long-lasting (e.g., not a one-time lick use) flavor in one location instead of a one-time-use flavor that is positioned around the rim of a beverage. For example, and as noted above, when a user licks salt from a margarita rim, the next time the user wants salt, the user must find another, unused portion of the rim to lick. With the flavor strip 100, the user can lick the same portion multiple times, and throughout the duration of the drink, to receive the desired flavor. Another advantage of the flavor strip 100 is that the flavor strip 100 is secured to the beverage or product and provides flavor or taste to the user without wasted debris. For example, salt often falls from a salted margarita glass rim whereas the flavor strip 100 generally does not result in excess debris that might make a mess. Yet another advantage of the flavor strip 100 is that the flavor strip 100 can be coupled to a beverage container when the beverage container is full and substantially upright. For example, in order to salt a margarita glass, the margarita glass is generally empty and held upside down to be dipped in salt. With the flavor strip 100, the flavor strip 100 can be adhered or attached to lid-less beverages that are filled, have no top to prevent spillage, and are substantially upright.

As illustrated in FIG. 1, the flavor strip 100 includes a length 100a, a thickness 100b, and a width 100c. As illustrated, the thickness 100b is measured in a direction that is perpendicular to the surface from which it is configured to be applied. In one embodiment, the flavor strip 100 forms a consumer-facing surface 110 and an opposing product-facing surface 115. Generally, the term "product-facing surface" does not require the surface to contact the product being consumed but merely be opposing to the consumer-facing surface 110 and therefore closer to the product being consumed than the consumer-facing surface 110. In some embodiments, the surfaces 110 and 115 are identical in texture and material, whereas in other embodiments, the consumer-facing surface 110 includes a different texture and/or different materials than the product-facing surface 115.

Regarding the texture of the flavor strip 100, in some embodiments, the surface 110, the surface 115, or both the surfaces 110 and 115 have a bumpy texture that mimic the texture of a conventional garnish or flavoring, such as salt or salt mixture (e.g., Tajín® of Industrias Tajín, S. A. DE C. V. of Jalisco, Mexico). For example, when the texture of the surface 110 and/or 115 is configured to mimic kosher salt, the texture of the flavor strip 100 includes protrusions, nubs, or bumps that form a height differential that are about the average size of a kosher salt grain. For example, if the texture of the flavor strip 100 is configured to mimic the texture of coarse salt, which has an average grain size between about 2 mm and 5 mm, the height differential formed between bumps on the surface 110 is also between about 2 mm and 5 mm. However, if the texture of the flavor strip 100 is configured to mimic the texture of kosher salt, which has an average grain size between about 1 mm and 2 mm, then the height differential formed between bumps on the surface 110 is also between about 1 mm and about 2 mm. Another example is when the flavor strip 100 is configured to mimic the texture of Tajín, which includes ingredients of dried chili peppers and sea salt, and in this example, the bumps on the surface 110 are sized to mimic the height differential formed when Tajin is applied to a flat surface.

Regarding the composition of the flavor strip 100, in some embodiments the composition of the flavor strip 100 is consistent throughout the thickness 100b, the width 100c, and the length 100a such that the consumer-facing surface 110 is the same as the opposing product-facing surface 115. In other embodiments, the composition of the flavor strip 100 changes along the thickness 100b such that the product-facing surface 115, which is configured to be applied to the surface 105, is different from the consumer-facing surface 110, which is configured to be licked or otherwise consumed by the consumer. In some embodiments, the consumer-facing surface 110 has a volume and a flavor saturation, intensity, or concentration (per volume) of a predetermined flavor that is higher than the flavor saturation, intensity, or concentration (per volume) of the flavor or garnish that the flavor strip 100 is configured to mimic. For example, and when the flavor strip 100 is designed to mimic the experience of a user licking the rim of a salted margarita glass, the consumer-facing surface 110 may include a flavor saturation per volume higher than the flavor saturation of the salt on the salted margarita glass. In some embodiments, licking the salt from a margarita glass allows the user to pick up the salt grain with her or her tongue and the flavor of that salt grain is imparted to the user. As such, the flavor tasted by the user is a function of the volume of salt grain picked up by the user and the flavor saturation of the salt grain. When using the flavor strip, which is multi-use, the volume of the surface 110 that is picked up by the user is generally significantly less than the volume picked up when licking a salt rim. To mimic the same flavor profile, the flavor concentration of the volume picked up from the surface 110 must be greater than the flavor concentration of the salt grain. As such, the flavor saturation, intensity, or concentration of the surface 110 is often greater than the flavor saturation, intensity, or concentration of the flavor that the flavor strip 100 is mimicking. In some embodiments, the flavor intensity by volume of the strip 100 is 2×, 3×, 4×, 5×, 6×, 7×, 8×, 9×, 10×, and so on greater than the flavor intensity by volume of the edible product being mimicked.

In some embodiments, the flavor strip 100 has one flavor that is consistent throughout the length 100a, the thickness 100b, and the width 100c. In other embodiments, the flavor strip 10 has multiple flavors. In some embodiments, the flavor of the adhesive flavor strip 100 changes from a first flavor to a second flavor along the thickness 100b of the strip 100, such that, as the strip 100 dissolves (via the user licking the strip 100) the flavor changes from the first to the second flavor. The number of flavors is not limited to two and may be three, four, five, etc. In other embodiments, the flavor changes along the length of the strip 100 such that the consumer can choose which flavor to taste depending on which "end" or portion of the strip 100 is licked.

In some embodiments, the product-facing surface 115 includes an adhesive material that is designed to couple or otherwise attach the flavor strip 100 to the surface 105. In some embodiments, the adhesive material is an edible adhesive material such as a starch adhesive, a sugar adhesive, and the like. The adhesive may be a natural or synthetic-based adhesive. In some embodiments, the product-facing surface 115 includes a moisture-activated adhesive material and/or a heat-activated adhesive material. For example, the product-facing surface 115 may be capable of transforming from a first state, in which the surface 115 has a first strength of adhesion, to a second state, which has a second strength of adhesion that is greater than the first strength of adhesion. The product-facing surface 115 may be manufactured and sold when in the first state and be activated to the second state by the consumer or user of the flavor strip 100. An example transformation includes the consumer or user licking the product-facing surface 115 to transform the surface 115 to the second state before applying the flavor strip 100 to the surface 105. Activation is not limited to licking the product-facing surface 115, and instead, wetting the surface 115 may be accomplished via a wet cloth, application of drops of water, etc. In some embodiments, the composition of the flavor strip 100 is consistent or near consistent (e.g., designed for consistency but allowing for variations in the manufacturing process) and the entirety of the flavor strip 100 is an adhesive material that is capable of sticking to a surface 105 after licked or otherwise wetted. That is, the entirety of the strip 100 is formed by a material that is has a strength of adhesion sufficient to attach the strip 100 to the surface 105. A heat-activated adhesive material is similar to the moisture-activated adhesive material except that the activation from the first state to the second state occurs when a specific temperature is obtained. For example, the flavor strip 100 can be placed against a warm surface (e.g., consumer's hand) for a certain period of time before being applied to the surface 105. In other embodiments, the product-facing surface 115 has a strength of adhesion sufficient to attach the strip 100 to the surface 105 without an activation process. For example, the flavor strip 100 may include a sheet (not illustrated in the Figures) that covers the adhesive material of the product-facing surface 115 and the sheet is removed to expose the adhesive material before the flavor strip 100 is applied to the surface 105. Moreover, another example includes the flavor strip 100 being rolled up on itself to form a roll such that the product-facing surface 115 is in contact with the consumer-facing surface 110 until a portion of the flavor strip 100 is unrolled and then detached from the roll.

Regarding the shape of the strip 100, the footprint (e.g., defined by the length 100a and the width 100c) of the strip 100 may form a shape such as for example lips, a rectangle, a heart, a square, a half circle, a star, a tongue, an oval, a water drop, fruit shapes, a moon, or any other shape.

Regarding the flavor of the strip 100, the flavor may include natural flavors, artificial flavors, or a combination of natural and artificial flavors. The flavor may be carried by or be a part of an edible flavor structure, such as an oil, powder, or crystalline structure among others. The flavor may include a salt flavor, a Tajin flavor, a flavor associated with carbonated beverages (e.g., Coca-Cola®, Dr. Pepper®, Sprite®, Fanta®, etc.), a coffee flavor, a chocolate flavor, other types of flavor enhancers (e.g., salt) or result in a specific taste (e.g., sour, salty, sweet, bitter, and umami).

Figure 2:
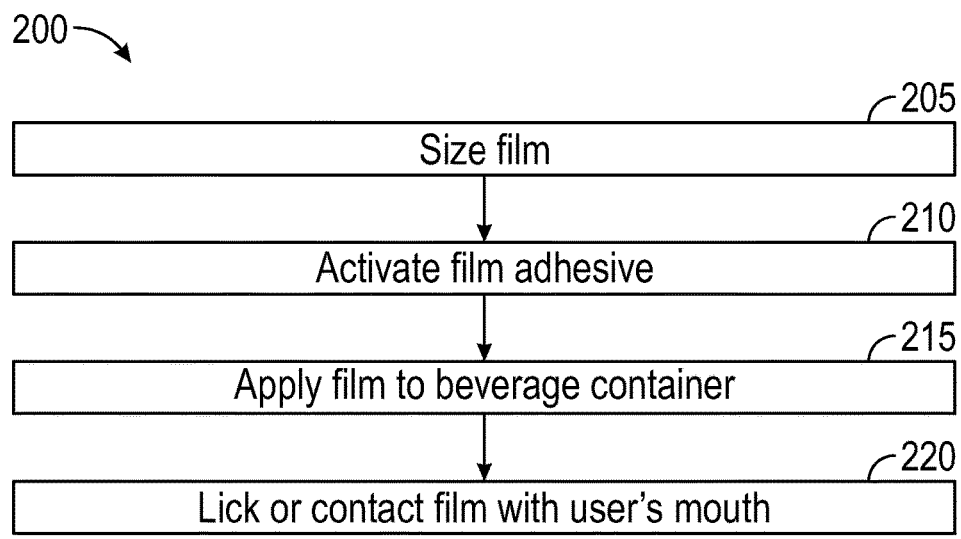
FIG. 2 is a flow-chart diagram of a method, according to an example embodiment.

In an example embodiment, as illustrated in FIG. 2 with continuing reference to FIG. 1, a method 200 of creating and drinking a beverage includes sizing the flavor strip 100 at step 205; activating the adhesive at step 210; applying the strip 100 to the beverage container 300 at step 215; and licking the flavor strip 100 or other otherwise contacting the flavor strip 100 to the user's mouth at step 220. Any number of steps may be omitted from the method 200.

In some embodiments and at the step 205, the flavor strip 100 is sized. In some embodiments, such as when multiple flavor strips 100 are connected and rolled onto themselves to form a roll, the flavor strip 100 is sized by disconnecting one flavor strip 100 from the roll. This step may be omitted. Instead, in some embodiments, the flavor strip 100 is packaged in an individual packet.

In some embodiments and at the step 210, the adhesive material of the flavor strip 100 is activated. For example, and when the flavor strip 100 includes the moisture-activated adhesive material, the step 210 includes wetting the adhesive material. When the flavor strip 100 includes the heat-activated adhesive material, the step 210 includes warming the adhesive material. When the flavor strip 100 is covered by the sheet, then the step 210 includes removing the sheet to expose the adhesive material. When the flavor strip 100 has been formed into a roll, then the step 210 includes unrolling the roll thereby exposing the adhesive material.

Figure 3:
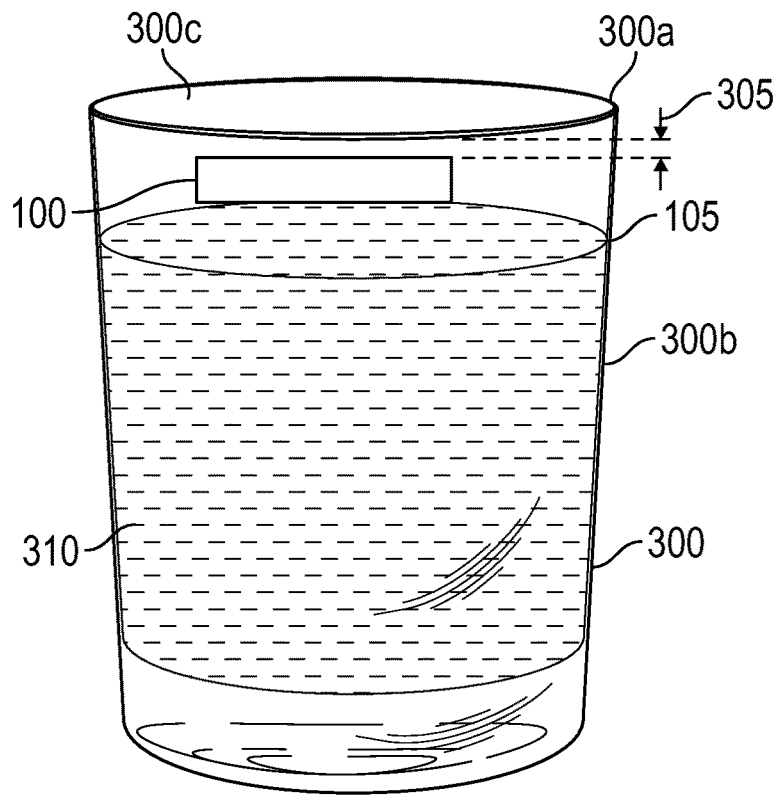
FIG. 3 illustrates the flavor strip of FIG. 1 adhered to a beverage container, according to an example embodiment.
Figure 4:
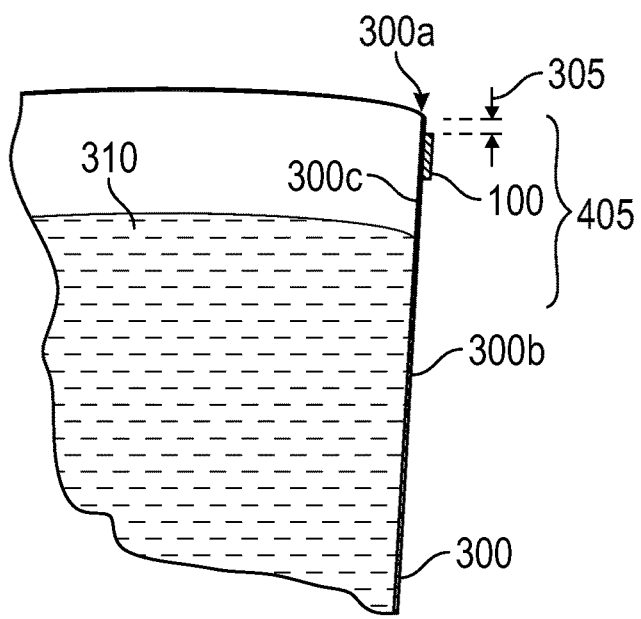
FIG. 4 is a cross-sectional view of a portion of the beverage container and the flavor strip of FIG. 3, according to an example embodiment.

In some embodiments and at the step 215, the flavor strip 100 is applied to the surface 105 of the beverage container 300, which is illustrated in FIGS. 3 and 4. As illustrated, the beverage container 300 includes a rim 300a that divides an external surface 300b of the container 300 from the interior surface 300c of the container 300. The container 300 contains a liquid 310. Generally, the step 215 includes selecting a location on the external surface 300b of the beverage container and then adhering the adhesive flavor strip 100 to the location of the beverage container 300. As illustrated, the flavor strip 100 is spaced from the rim 300a by a distance 305. The distance 305 is determined by the user applying the flavor strip 100 and allows a level of customization by the user that is not currently allowed using conventional garnishes or flavorings. For example, the flavor strip 100 may be placed along the rim 300a, over the rim 300a to contact the interior surface 300c and the external surface 300b, or spaced from the rim 300a on the external surface 300b. As illustrated, one example placement position of the flavor strip 100 is an upper area 405 that includes a portion of the external surface 300b closest to the rim 300a. In some embodiments, the upper area 405 includes approximately 1 inch below the rim 300a. In another embodiment, the flavor strip 100 only touches the external surface 300b and does not come in contact with the interior surface 300c and/or the rim 300a. Example beverage containers 300 includes a beer bottle, assorted shapes of disposable and reusable plastic bottles, a water glass, a children's cup, a disposable cup, a coffee mug, a martini glass, a champagne flute, an espresso cup, a cappuccino cup, assorted shapes of glass bottles, assorted shapes of aluminum cans, assorted shapes of cups and glasses, assorted shapes of milk containers, a liquor shot glass, a liquor bottle, a workout supplemental shaker or mixer, or other container. Generally, the flavor strip 100 may be attached to any portion of the container 300, such as the neck, the body, and the stem.

The container illustrated in FIGS. 3 and 4 is a lid-less container, which is a container lacking a lid, top, or other nozzle that prevents the liquid 310 from spilling out of the container 300 when tilted or moved from an upright position.

In some embodiments and at the step 220, the flavor strip 100 is licked or otherwise makes contact with the user's mouth. As noted above, the flavor strip 100 is a multi-lick strip that is configured to provide flavor to a user throughout the duration of a drink, such as for example a 12 oz drink, an 8 oz drink, a 6 oz drink, a 14 oz drink, a 20 oz drink and the like. The user may choose to lick the flavor strip 100 before each sip of liquid 310 and/or depending on the placement of the strip 100, take a sip at a location at which the strip 100 has been applied, and therefore, receive flavor as sipping the beverage/liquid 310. For example, when the beverage container 300 is a canned drink with a pop-top, the flavor strip 100 can be placed directly below the pop-top so that flavor is obtained every time the user takes a sip from the pop-top. In some embodiments, the flavor strip 100 is not specifically licked, but at least partially placed within the mouth or on the lip(s) of the user and transfers flavor to the user in that manner. That is, in some embodiments, when the user places the beverage container in, or against, the user's mouth to take a drink of the beverage, the flavor strip 100 is positioned within or against the user's mouth and transfers a flavor to the user.

In some embodiments, the step 220 is repeated. In some embodiments, the flavor strip 100 is constructed with layers of flavor along the thickness 100b, such that the flavor changes as the number of licks increases and the thickness 100b dissolves to expose different flavors.

In some embodiments, the strip 100 is dissolvable such that repeated licks or contact with a user's mouth dissolves the strip 100. If remnants of the strip 100 remain after the user has finished using the strip 100, the strip 100 can be washed off from the beverage container 300 or thrown out with the beverage container 300 if the beverage container is single-use or otherwise disposable.

Figure 5:
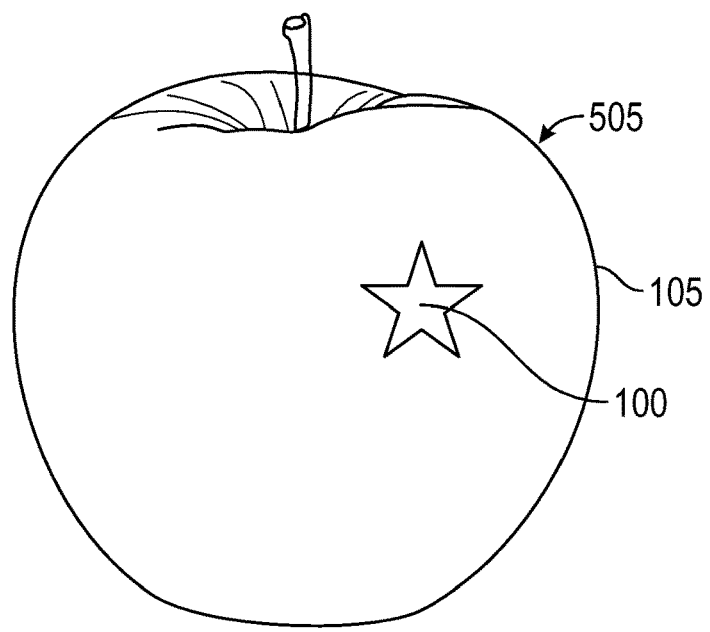
FIG. 5 illustrates a flavor strip adhered to a first edible item, according to an example embodiment.
Figure 6:
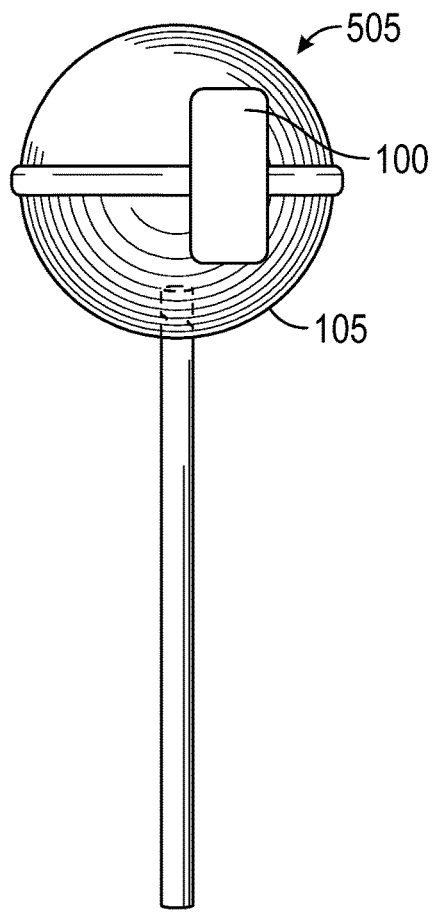
FIG. 6 illustrates a flavor strip adhered to a second edible item, according to an example embodiment.

In some embodiments, the strip 100 is applied to an edible product. FIG. 5 illustrates the strip 100 applied to a piece of fruit 505 and FIG. 6 illustrates the strip 100 applied to a piece of candy 605. When the strip 100 is applied to the edible product, the strip 100 may be licked or otherwise contact the user's mouth in a manner similar to the manner described above. That is, the strip 100 can be licked before eating a portion of the edible product that is not covered by the strip 100. However, in other embodiments, the strip 100 or a portion thereof can be consumed with the edible product when the edible product is covered by the strip 100. Examples of an edible product include a fruit, vegetable, dessert, processed food, or other food product. When attached to a food product, the strip 100 may be attached to any portion of the food product.

In some embodiments, the strip 100 forms a kit. For example, the strip 100 and a cup or beverage container may be stored together but separately and together provided to a consumer. For example, an airline attendant may provide a customer with a canned drink, a cup, and a strip 100 so that the customer can pour the liquid from the canned drink into the cup and apply the strip 100 to the cup (or canned drink if the customer prefers to drink the liquid directly from the canned drink).

As noted above, one advantage of the flavor strip 100 is that the flavor strip 100, in some embodiments, is licked by the user consuming the food or beverage product to enhance or augment the flavor of the food or beverage. When a person licks the flavor strip 100, the person will taste the flavor of the flavor strip 100. In some embodiments, the flavor of the flavor strip 100 may last through being licked multiple times, such that the flavor lasts for the duration of the consumption of a food or beverage product. When the flavor strip 100 is positioned on a food product, the user may lick the tape to "taste" the flavor strip 100 and/or eat a portion of the flavor strip 100.

Another advantage relating to the flavor strip 100, and also noted above, is that the flavor strip 100 may be attached to the external surface 300b and/or the rim 300a of a beverage container 300 while the beverage container is filled with liquid. The flavor strip 100 may be attached to the external surface 300b and/or the rim 300a while the beverage container 300 is substantially upright (i.e., +/−20% from vertical). In addition, the flavor strip 100 may be attached to the external surface 300b and/or the rim 300a of the beverage container 300 such that the flavor strip 100 is fixed to the beverage container for the duration of the consumption of the beverage. Being fixed to the beverage container 300 reduces the mess conventionally associated with flavor additives for food and beverage products and serves as an alternative to conventional methods of "dressing" or "garnishing" beverages.

In some embodiments, the flavor strip 100 may be attached to the interior surface 300c of a beverage container 300. When attached to the interior surface 300c of a beverage container 300, the flavor strip 100 may be attached while the beverage container 300 is filled with liquid and is substantially upright.

In some embodiments, two or more strips 100 may be attached to the same edible product or beverage container 300. The multiple strips 100 attached to the same edible product or beverage container 300 may be the same or different flavors.

In some embodiments, the food or beverage container 300 has a circumference defined by the external surface 300b and the strip 100 may be positioned along one portion of the circumference or the entirety of the circumference.

In some embodiments, the adhesive flavor strip 100 is adhered to a smoking apparatus to add flavor while smoking. Examples of smoking apparatuses include a bong, a blunt, a pipe, a vape pen, hookah, etc. In some embodiments, the flavored adhesive strip adhered to a smoking apparatus is shaped and configured to attach to the smoking apparatus. In some embodiments, the adhesive flavor strip 100 that is configured to attach to the smoking apparatus is attached near or on the mouthpiece such that the lips of the user engage/touch/contact the strip when the user is smoking from the smoking apparatus.

In some examples the adhesive flavor strip 100 includes cannabinoids.

In some embodiments, the flavored adhesive strip 100 includes hydrophilic polymers that dissolve when contact with liquid is made. In some embodiments, the polymer includes or is microcrystalline cellulose, maltodextrin, and/or pullulan. In some embodiments, the flavored adhesive strip also includes plasticizers such as for example glycerol, propylene glycol, low molecular weight polyethylene glycols, phthalate derivatives like dimethyl, diethyl and dibutyl phthalate, Citrate derivatives such as tributyl, triethyl, acetyl citrate, triacetin and castor oil.

The term "about," as used herein, should generally be understood to refer to both numbers in a range of numerals. For example, "about 1 to 2" should be understood as "about 1 to about 2." Moreover, all numerical ranges herein should be understood to include each whole integer, or 1/10 of an integer, within the range.

The terms strip and tape are used interchangeably herein.

The present disclosure provides an adhesive flavor strip configured to be adhered to a beverage container, the flavor strip comprising: a length, a width, and a thickness; a consumer-facing surface extending along the length and the width of the flavor strip; and a container-facing surface opposing the consumer-facing surface; wherein the beverage container comprises a rim that separates an external surface of the container from an interior surface of the container; wherein the container-facing surface is configured to be adhered to the external surface of the container; wherein the adhesive flavor strip has a first flavor; and wherein the consumer-facing surface is configured to be licked by a consumer of the beverage or to make contact with the mouth of the consumer while adhered to the beverage container to provide the consumer a taste of the first flavor. In some embodiments, the container-facing surface is a moisture-activated adhesive material configured to transform from a first state having a first strength of adhesion to a second state having a second strength of adhesion greater than the first strength. In some embodiments, the adhesive flavor strip is configured to provide the flavor of an edible product that has an average shape and size; and wherein the consumer-facing surface is a textured surface having height differentials based on the average shape and size of the edible product. In some embodiments, the adhesive flavor strip flavor has a second flavor that is different from the first flavor; and wherein the flavor of the adhesive flavor strip changes from the first flavor to the second flavor along the thickness of the strip or along the length of the strip. In some embodiments, the entirety of the flavor strip is spaced from the rim of the beverage container. In some embodiments, the flavor strip has a footprint defining a shape; and wherein the shape is selected from the group consisting of a rectangle, a square, a heart, lips, a moon, a star, and a sun. In some embodiments, the first flavor has a first flavor intensity; wherein the first flavor is configured to mimic an edible product having a second flavor intensity; and wherein the first flavor intensity is greater than the second intensity. In some embodiments, the adhesive flavor strip includes a cannabinoid. In some embodiments, the adhesive flavor strip is a multi-lick flavor strip that dissolves with repeated licks by the consumer. In some embodiments, a kit comprises the adhesive flavor strip as described above, and the beverage container.

The present disclosure provides a method of creating a beverage using the beverage container, the method comprising: selecting a location on the external surface of the beverage container; and adhering the adhesive flavor strip as described above to the location of the beverage container. In some embodiments, the beverage container is lid-less container; and wherein the lid-less container is accommodating a liquid when the adhesive flavor strip as described above is adhered to the beverage container. In some embodiments, the first flavor has a first flavor intensity; wherein the first flavor is configured to mimic an edible product having a second flavor intensity; and wherein the first flavor intensity is greater than the second intensity. In some embodiments, the adhesive flavor strip includes a cannabinoid.

The present disclosure provides an adhesive flavor strip configured to be adhered to a first edible product, the flavor strip comprising: a length, a width, and a thickness; a consumer-facing surface extending along the length and the width of the flavor strip; and a product-facing surface opposing the consumer-facing surface; wherein the adhesive flavor strip has a first flavor; and wherein the consumer-facing surface is configured to be consumed by a consumer of the first edible product while adhered to the first edible product to provide the consumer a taste of the first flavor; wherein the first flavor has a first flavor intensity; wherein the first flavor is configured to mimic a second edible product having a second flavor intensity; and wherein the first flavor intensity is greater than the second intensity. In some embodiments, the product-facing surface is a moisture-activated adhesive material configured to transform from a first state having a first strength of adhesion to a second state having a second strength of adhesion greater than the first strength. In some embodiments, wherein the adhesive flavor strip is configured to provide the flavor of a second edible product that has an average shape and size; and wherein the consumer-facing surface is a textured surface having height differentials based on the average shape and size of the edible product. In some embodiments, the adhesive flavor strip flavor has a second flavor that is different from the first flavor; and wherein the flavor of the adhesive flavor strip changes from the first flavor to the second flavor along the thickness of the strip or along the length of the strip. In some embodiments, the flavor strip has a footprint defining a shape; and wherein the shape is selected from the group consisting of a rectangle, a square, a heart, lips, a moon, a star, and a sun. In some embodiments, the adhesive flavor strip includes a cannabinoid.

In several example embodiments, the elements and teachings of the various illustrative example embodiments may be combined in whole or in part in some or all of the illustrative example embodiments. In addition, one or more of the elements and teachings of the various illustrative example embodiments may be omitted, at least in part, or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "left," "right," "right-to-left," "top-to-bottom," "bottom-to-top," "top," "bottom," "bottom-up," "top-down," etc., are for the purpose of illustration only and do not limit the specific orientation or location of the structure described above.

In several example embodiments, while different steps, processes, and procedures are described as appearing as distinct acts, one or more of the steps, one or more of the processes, or one or more of the procedures may also be performed in different orders, simultaneously or sequentially. In several example embodiments, the steps, processes, or procedures may be merged into one or more steps, processes, or procedures. In several example embodiments, one or more of the operational steps in each embodiment may be omitted. Moreover, in some instances, some features of the present disclosure may be employed without a corresponding use of the other features. Moreover, one or more of the example embodiments disclosed above and in one or more of FIGS. 1-6 may be combined in whole or in part with any one or more of the other example embodiments described above and in one or more of FIGS. 1-6.

Although several example embodiments have been disclosed in detail above and in one or more of FIGS. 1-6, the embodiments disclosed are example only and are not limiting, and those skilled in the art will readily appreciate that many other modifications, changes, and substitutions are possible in the example embodiments without materially departing from the novel teachings and advantages of the present disclosure. Accordingly, all such modifications, changes, and substitutions are intended to be included within the scope of this disclosure as defined in the following claims. In the claims, means-plus-function clauses are intended to cover the structures described herein as performing the recited function and not only structural equivalents, but also equivalent structures.

What is claimed is:

1. An adhesive flavor strip configured to be adhered to a beverage container, the adhesive flavor strip comprising:
   a length, a width, and a thickness;
   a consumer-facing surface extending along the length and the width of the adhesive flavor strip; and
   a container-facing surface opposing the consumer-facing surface;
   wherein the beverage container comprises a rim that separates an external surface of the container from an interior surface of the container;
   wherein the container-facing surface is configured to be adhered to the external surface of the container;
   wherein the adhesive flavor strip has a first flavor;
   wherein the consumer-facing surface is configured to be licked by a consumer of a beverage in the beverage container or to make contact with a mouth of the consumer while adhered to the beverage container to provide the consumer a taste of the first flavor;
   wherein the first flavor has a first flavor concentration by volume of the adhesive flavor strip;
   wherein the first flavor is configured to mimic an edible product or beverage having a second flavor concentration by volume of the edible product or beverage; and
   wherein the first flavor concentration by volume of the adhesive flavor strip is greater than the second flavor concentration by volume of the edible product or beverage.

2. The adhesive flavor strip of claim 1, wherein the container-facing surface is a moisture-activated adhesive material configured to transform capable of transforming from a first state having a first strength of adhesion to a second state having a second strength of adhesion greater than the first strength.

3. The adhesive flavor strip of claim 1,
   wherein the adhesive flavor strip is configured to provide a flavor of an edible product that has a size; and
   wherein the consumer-facing surface is a textured surface having height differentials based on the size of the edible product.

4. The adhesive flavor strip of claim 1,
   wherein the adhesive flavor strip has a second flavor that is different from the first flavor; and
   wherein a flavor of the adhesive flavor strip changes from the first flavor to the second flavor along the thickness of the strip or along the length of the strip.

5. The adhesive flavor strip of claim 1, wherein an entirety of the adhesive flavor strip is spaced from the rim of the beverage container.

6. The adhesive flavor strip of claim 1,
   wherein the adhesive flavor strip has a footprint defining a shape; and
   wherein the shape is selected from the group consisting of a rectangle, a square, a heart, lips, a moon, a star, and a sun.

7. The adhesive flavor strip of claim 1, wherein the adhesive flavor strip includes a cannabinoid.

8. The adhesive flavor strip of claim 1, wherein the adhesive flavor strip is a multi-lick flavor strip that dissolves with repeated licks by the consumer.

9. The adhesive flavor strip of claim 1, wherein the first flavor concentration by volume of the flavor strip is more than double than the second flavor concentration by volume of the edible product or beverage.

10. An adhesive flavor strip configured to be adhered to a first edible product, the adhesive flavor strip comprising:
    a length, a width, and a thickness;
    a consumer-facing surface extending along the length and the width of the adhesive flavor strip; and
    a product-facing surface opposing the consumer-facing surface;
    wherein the adhesive flavor strip has a first flavor; and
    wherein the consumer-facing surface is configured to be consumed by a consumer of the first edible product while adhered to the first edible product to provide the consumer a taste of the first flavor;
    wherein the first flavor has a first flavor concentration by volume of the flavor strip;
    wherein the first flavor is configured to mimic a second edible product having a second flavor concentration by volume of the second edible product or beverage; and
    wherein the first flavor concentration by volume of the flavor strip is greater than the second intensity flavor concentration by volume of the second edible product or beverage.

11. The adhesive flavor strip of claim 10, wherein the product-facing surface is a moisture-activated adhesive material capable of transforming from a first state having a first strength of adhesion to a second state having a second strength of adhesion greater than the first strength of adhesion.

12. The adhesive flavor strip of claim 10,
wherein the adhesive flavor strip is configured to provide a flavor of a second edible product that has a size; and
wherein the consumer-facing surface is a textured surface having height differentials based on the size of the second edible product.

13. The adhesive flavor strip of claim 10,
wherein the adhesive flavor strip has a second flavor that is different from the first flavor; and
wherein a flavor of the adhesive flavor strip changes from the first flavor to the second flavor along the thickness of the strip or along the length of the strip.

14. The adhesive flavor strip of claim 10,
wherein the adhesive flavor strip has a footprint defining a shape; and
wherein the shape is selected from the group consisting of a rectangle, a square, a heart, lips, a moon, a star, and a sun.

15. The adhesive flavor strip of claim 10, wherein the adhesive flavor strip includes a cannabinoid.

16. An adhesive flavor strip configured to be adhered to a beverage container,
the adhesive flavor strip comprising:
a length, a width, and a thickness;
a consumer-facing surface extending along the length and the width of the adhesive flavor strip; and
a container-facing surface opposing the consumer-facing surface;
wherein the beverage container comprises a rim that separates an external surface of the container from an interior surface of the container;
wherein the container-facing surface is configured to be adhered to the external surface of the container;
wherein the adhesive flavor strip has a first flavor;
wherein the consumer-facing surface is configured to be licked by a consumer of a beverage in the beverage container or to make contact with a mouth of the consumer while adhered to the beverage container to provide the consumer a taste of the first flavor;
wherein the adhesive flavor strip is configured to provide a flavor of an edible product that has a size;
wherein the consumer-facing surface is a textured surface having protrusions with height differentials formed between the protrusions; and
wherein the height differentials are based on the size of the edible product to mimic the size of the edible product.

17. The adhesive flavor strip of claim 16, wherein the height differentials are between about 2 mm and 5 mm or between about 1 mm and 2 mm.

18. The adhesive flavor strip of claim 16,
wherein the container-facing surface is another textured having protrusions with height differentials formed between the protrusions; and
wherein the height differentials are based on the size of the edible product.

19. The adhesive flavor strip of claim 16, wherein the edible product comprises grains of salt.

20. An adhesive flavor strip configured to be adhered to a beverage container,
the adhesive flavor strip comprising:
a length, a width, and a thickness;
a consumer-facing surface extending along the length and the width of the adhesive flavor strip; and
a container-facing surface opposing the consumer-facing surface;
wherein the beverage container comprises a rim that separates an external surface of the container from an interior surface of the container;
wherein the container-facing surface is configured to be adhered to the external surface of the container;
wherein the adhesive flavor strip has a first flavor;
wherein the consumer-facing surface is configured to be licked by a consumer of a beverage in the beverage container or to make contact with a mouth of the consumer while adhered to the beverage container to provide the consumer a taste of the first flavor; and
wherein the adhesive flavor strip includes a cannabinoid.

21. The adhesive flavor strip of claim 20, wherein the adhesive flavor strip is a multi-lick flavor strip that dissolves with repeated licks by the consumer.

22. The adhesive flavor strip of claim 20, wherein an entirety of the adhesive flavor strip is spaced from the rim of the beverage container.

23. The adhesive flavor strip of claim 20, wherein the container-facing surface is a moisture-activated adhesive material capable of transforming from a first state having a first strength of adhesion to a second state having a second strength of adhesion greater than the first strength.

* * * * *

UNITED STATES PATENT AND TRADEMARK OFFICE
CERTIFICATE OF CORRECTION

| | | |
|---|---|---|
| PATENT NO. | : 12,129,089 B1 | Page 1 of 1 |
| APPLICATION NO. | : 18/432961 | |
| DATED | : October 29, 2024 | |
| INVENTOR(S) | : Jeremy Graves and Meredith N. Graves | |

It is certified that error appears in the above-identified patent and that said Letters Patent is hereby corrected as shown below:

In the Claims

Column 10, Line 12, in Claim 2, delete "configured to transform" after --material--

Column 10, Line 65, in Claim 10, delete "intensity" after --than the second--

Signed and Sealed this
Thirty-first Day of December, 2024

Derrick Brent
*Acting Director of the United States Patent and Trademark Office*